United States Patent [19]

Dougan

[11] Patent Number: 4,628,674
[45] Date of Patent: Dec. 16, 1986

[54] LEAF-HANDLING APPARATUS

[76] Inventor: Murray D. Dougan, 106 Lake Dr., Williamsburg, Va. 23185

[21] Appl. No.: 800,811

[22] Filed: Nov. 22, 1985

[51] Int. Cl.⁴ ............................................. A01D 7/02
[52] U.S. Cl. ............................ 56/400.04; 56/400.17; 56/12.8
[58] Field of Search .......... 56/400.01, 400.04, 400.05, 56/400.06, 400.08, 400.14–400.20, 12.8, DIG. 8; 15/328, 329, 330, 344; 172/374–378

[56] References Cited

U.S. PATENT DOCUMENTS

| 893,627 | 7/1908 | Hosmer | 172/611 |
| 954,260 | 5/1910 | Davis | 15/405 |
| 2,543,833 | 3/1951 | Clark | 15/405 |
| 2,638,730 | 5/1953 | Davidson | 56/400.04 |
| 2,705,394 | 4/1955 | Steensen | 56/400.08 |
| 2,801,431 | 8/1957 | Eastis | 15/328 |
| 3,053,311 | 9/1962 | Nottage | 56/400.01 |
| 3,332,223 | 7/1967 | Polisso | 56/400.17 |
| 3,999,243 | 12/1976 | La Pour | 15/344 |
| 4,132,507 | 1/1979 | Akiyama et al. | 15/344 |
| 4,288,886 | 9/1981 | Siegler | 15/344 |

Primary Examiner—Gene Mancene
Assistant Examiner—John G. Weiss
Attorney, Agent, or Firm—Norman B. Rainer

[57] ABSTRACT

A leaf handling apparatus is provided which interactively combines the effects of a rake and an air blower. The apparatus is comprised of an elongated straight rigid shaft having two adjustable handles for hand-held manipulation of the apparatus. Two sets of elongated flexible tines are positioned at the lower extremity of the shaft. An air conduit tube is attached to the shaft in substantially coextensive relationship therewith. The lower extremity of the conduit has a nozzle which is disposed below the tines. An air blower can be removably associated with the upper extremity of the conduit. Air blown through the nozzle into close proximity with the tines facilitates the handling of leaves.

9 Claims, 3 Drawing Figures

LEAF-HANDLING APPARATUS

BACKGROUND OF THE INVENTION

This invention relates to apparatus for handling tree leaves fallen upon the ground, and more particularly concerns leaf-handling apparatus which interactively combines the effects of a rake and an air blower.

There is currently widespread use of lightweight hand-held leaf blowers capable of moving leaves by a forceful air stream produced by a motor or engine. Although such blower devices produce effective results when the leaves are on a hard surface or bare ground, they are very ineffective when the leaves are on a grassy surface because of the entangling interaction between the leaves and the grass. The blower is also relatively ineffective in moving wet leaves, twigs, and large piles of leaves because the energy requirements in such instances are beyond the capabilities of a hand-held air blower device.

Although greater power can be applied to leaves by a manually handled conventional leaf rake, considerable exertion and working time is required in using the rake.

It is accordingly an object of this invention to provide a leaf handling apparatus which combines the ease and speed of function of an air blower with the power deliverable by a rake.

It is another object of this invention to provide apparatus as in the foregoing object of sufficiently low weight to permit comfortable hand-held operation.

It is a further object of the present invention to provide apparatus of the aforesaid nature having adjustable features which permit optimal effectiveness in different tasks.

It is a still further object of this invention to provide apparatus of the aforesaid nature of rugged and simple design amenable to low cost manufacture.

These objects and other objects and advantages of the invention will be apparent from the following description.

SUMMARY OF THE INVENTION

The above and other beneficial objects and advantages are accomplished in accordance with the present invention by a leaf-handling apparatus comprising:

(a) an elongated straight rigid support shaft having upper and lower extremities, (b) a first handle associated with said upper extremity, and a second handle slidably positionable upon said shaft, (c) first and second fan-shaped sets of elongated spring steel tines associated with the lower extremity of said handle, said tines having curved tips, the tips of the tines of said first set being upwardly curved, and the tips of the tines of said second set being downwardly curved, (d) an elongated rigid air conduit tube attached to said shaft and generally coextensive therewith and having upstream and downstream extremities, (e) nozzle means associated with said downstream extremity and positioned below said tines, and (f) coupling means associated with said upstream extremity and adapted to removably hold a blower of conventional design in a manner such that said blower will direct air through said tube to said nozzle means.

In preferred embodiments of the invention, the first handle is of pistol-grip style, and is adapted to be rotatably positioned about the axis of elongation of the shaft. The second handle preferably has a gripping portion disposed transversely to the shaft axis. The fan-shaped sets of tines are symmetrically disposed about the shaft axis in a downwardly convex arcuate locus. The tines of the first set are preferably longer than the tines of the second set.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 2:
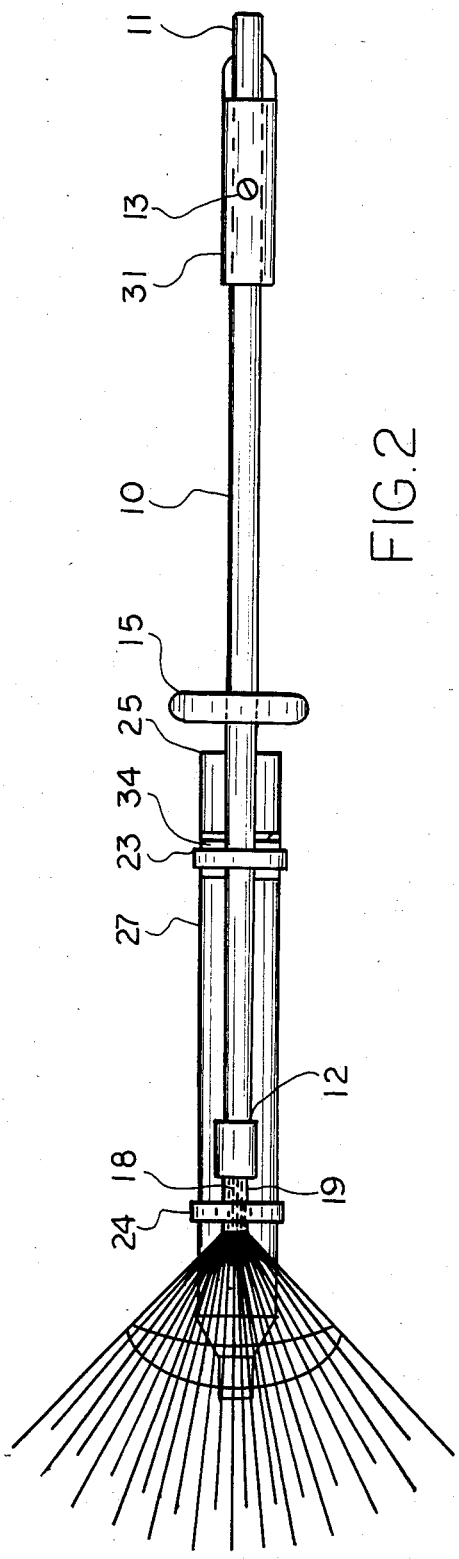
FIG. 2 is a top plan view of the apparatus of FIG. 1.
Figure 1:
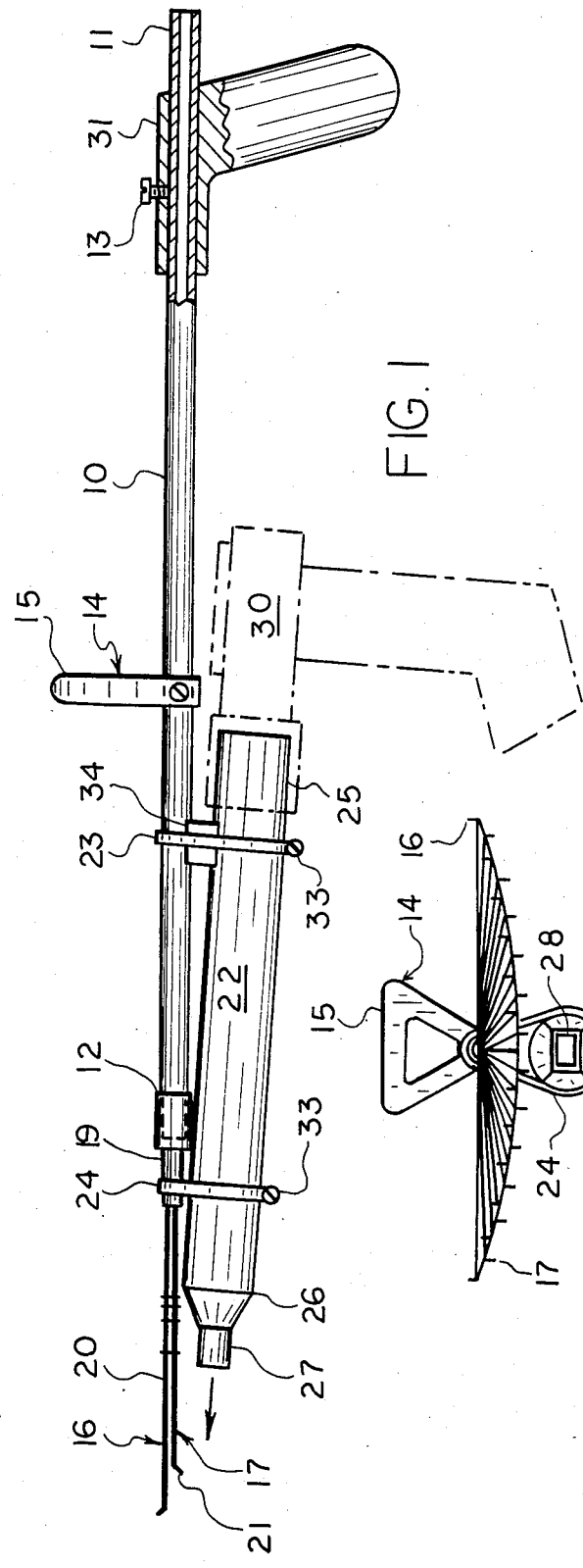
FIG. 1 is a side view of an embodiment of the apparatus of the present invention shown in association with a leaf blower of conventional design.

Referring to the drawing, an embodiment of the apparatus of this invention is shown comprised of elongated straight rigid support shaft 10 having upper and lower extremities 11 and 12, respectively. The shaft may have a diameter between about ¾" and 1¼" and a length between about 30 and 50 inches, and may be fabricated of wood, tubular aluminum, or equivalent materials. Although the exemplified shaft is of circular cylindrical configuration, other configurations may be utilized.

A first handle 31 having a pistol-grip shape is mounted upon said upper extremity in a manner to be rotatably positioned about the axis of elongation of said shaft. A threaded bolt 13 secures the handle against unwanted rotation. A second handle 14 is slidably positionable upon the shaft, and is provided with a gripping portion 15 disposed transversely to the shaft axis. A threaded bolt 35 secures said second handle in desired positions upon the shaft.

Figure 3:
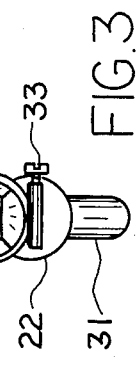
FIG. 3 is an end view taken from the left of FIG. 1.

First and second sets of tines, 16 and 17, respectively, are disposed at the lower extremity of the shaft. The tines are preferably fabricated of spring steel, having shank portions 18 anchored within collar 19 affixed to said lower extremity, straight arm portions 20 which radiate in fan-like manner symmetrically about the shaft axis, and terminating in curved tips 21. In alternative embodiments, the tines may be fabricated of rugged engineering grade plastics such as nylon, polyacetal and polycarbonate. The tips of said first set of tines are upwardly directed, and the tips of said second set are downwardly directed. Each set may be comprised of between about 15 and 25 tines. It is to be noted that the tines of the first set are longer than the tines of the second set. As shown in FIG. 3, the tines of both sets are disposed along an arcuate downwardly convex path. Supporting means may be disposed between adjacent arm portions of the tines and transversely oriented thereto for the purpose of strengthening the assembly of tines without impairing the flexibility of their movement.

An elongated rigid air conduit tube 22, having upstream and downstream extremities 25 and 26, respectively, is attached to said shaft by upper and lower encircling brackets 23 and 24, respectively, each bracket having a threaded tensioning bolt 33. The conduit is of circular cylindrical contour and may be fabricated of aluminum or plastic tubing. The conduit may have an inside diameter between about 2" and 4" and a length between about 20 and 40 inches. Although shown in its preferred position below the shaft, conduit tube 22 may, in other embodiments, be positioned above shaft 10. A spacer 34 may be disposed between the shaft and conduit to angle the conduit with respect to the shaft.

Nozzle means 27, attached to the downstream extremity of the conduit, is provided with a horizontally elongated exit aperture 28 located beneath the tines. Exit apertures of different configurations may however be utilized, and multiple apertures may be employed.

The upstream extremity 25 of tube 22 is adapted to securely accommodate a blower device 30 of conventional design. In certain embodiments, special coupling means may be associated with upstream extremity 25. The particular blower device exemplified in the drawing is operated by an electric motor.

In the operation of the apparatus, the two holding handles are positionally adjusted to provide maximum comfort for the user. Dry leaves lying on a flat surface are moved by sweeping the apparatus back and forth in an arc path with the nozzle held close to the ground. When leaves are encountered in tall grass, the apparatus is utilized in rake-like manner, whereby the blower augments the action of the tines. In handling large piles of leaves or wet leaves, the apparatus is utilized in pitch fork style wherein the tines are used to lift debris, and the lifting and dispensing action is augmented by the air stream. In alternative embodiments, the blower device may be replaced by a suction device to provide modified utility.

In order to strengthen the tines for lifting purposes, interactive support may be disposed between the downstream extremity of the conduit and the underside of the tines.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A leaf-handling apparatus comprising:
   (a) an elongated straight rigid support shaft having upper and lower extremities,
   (b) a first handle associated with said upper extremity, and a second handle slidably positionable upon said shaft,
   (c) first and second fan-shaped sets of elongated flexible tines associated with the lower extremity of said shaft, said tines having curved tips, the tips of the tines of said first set being upwardly curved, and the tips of the tines of said second set being downwardly curved,
   (d) an elongated rigid air conduit tube attached to said shaft therebelow and generally coextensive therewith and having upstream and downstream extremities, and
   (e) nozzle means associated with said downstream extremity and positioned below said tines,
   (f) said upstream extremity being configured to removably hold a blower of conventional design in a manner such that said blower will direct air through said tube to said nozzle means.

2. The apparatus of claim 1 wherein said first handle is of pistol-grip style, and is adapted to be rotatably positioned about the axis of elongation of the shaft.

3. The apparatus of claim 1 wherein said shaft is of uniform circular cross-sectional configuration.

4. The apparatus of claim 1 wherein said second handle has a gripping portion disposed transversely to said shaft axis.

5. The apparatus of claim 1 wherein said sets of tines are symmetrically disposed about said shaft axis in a downwardly convex arcuate locus.

6. The apparatus of claim 1 wherein the tines of said first set are longer than the tines of said second set.

7. The apparatus of claim 1 wherein supporting means are disposed between adjacent tines and transversely oriented thereto for the purpose of strengthening the array of tines without impairing their flexibility.

8. The apparatus of claim 1 wherein said tines are fabricated of spring steel.

9. The apparatus of claim 1 further provided with an electrically operated air blower mounted upon the upstream extremity of said conduit.

* * * * *